United States Patent

Salsburg et al.

[11] Patent Number: 5,451,133
[45] Date of Patent: Sep. 19, 1995

[54] DOCKING APPARATUS

[75] Inventors: Fredric Salsburg, Victor; William E. Roberts, Fairport; Stephen A. Yaeger, Rochester, all of N.Y.

[73] Assignee: Eastman Kodak Company, Rochester, N.Y.

[21] Appl. No.: 40,950

[22] Filed: Mar. 31, 1993

[51] Int. Cl.⁶ ............................................. B65G 67/02
[52] U.S. Cl. .................................. 414/401; 414/396; 414/584; 414/911; 414/908
[58] Field of Search ............... 414/401, 396, 584, 495, 414/589, 908, 911, 222, 225

[56] References Cited

U.S. PATENT DOCUMENTS

| | | | |
|---|---|---|---|
| 2,490,685 | 12/1949 | Greene | 414/911 |
| 2,896,909 | 7/1959 | Taylor | 414/589 |
| 3,095,987 | 7/1963 | Sable | 414/495 |
| 3,370,551 | 2/1968 | Shannon | 414/495 |
| 3,485,401 | 12/1969 | Meyer | 414/495 |
| 4,199,289 | 4/1980 | Segbert et al. | 414/401 X |
| 4,461,455 | 7/1984 | Mills et al. | 414/589 |
| 4,498,283 | 2/1985 | Kodama et al. | 57/261 |
| 4,597,709 | 7/1986 | Yonezawa | 414/401 X |
| 4,649,830 | 3/1987 | Tanaka | 414/217 |
| 4,746,258 | 5/1988 | Loomer et al. | 414/401 |
| 4,861,220 | 8/1989 | Smith | 414/495 |
| 4,893,963 | 1/1990 | Le Goff | 414/584 X |
| 4,915,569 | 4/1990 | Cherko | 414/401 |
| 5,023,534 | 6/1991 | Ueda et al. | 318/587 |
| 5,143,506 | 9/1992 | Sticht | 414/401 X |

Primary Examiner—Michael S. Huppert
Assistant Examiner—Stephen Gordon
Attorney, Agent, or Firm—Charles E. Snee, III

[57] ABSTRACT

A docking assembly (200) for docking with a vehicle (108), the vehicle having a nonrigid docking member (70) having an apparatus for positioning (124, 126, 128, 130, 132) mounted thereon. The docking assembly has a frame (202) to which is mounted a positioning slot (222) having flared walls (224) for guiding therein and securing thereto the apparatus for positioning of the vehicle to thereby dock the vehicle to the docking assembly.

3 Claims, 13 Drawing Sheets

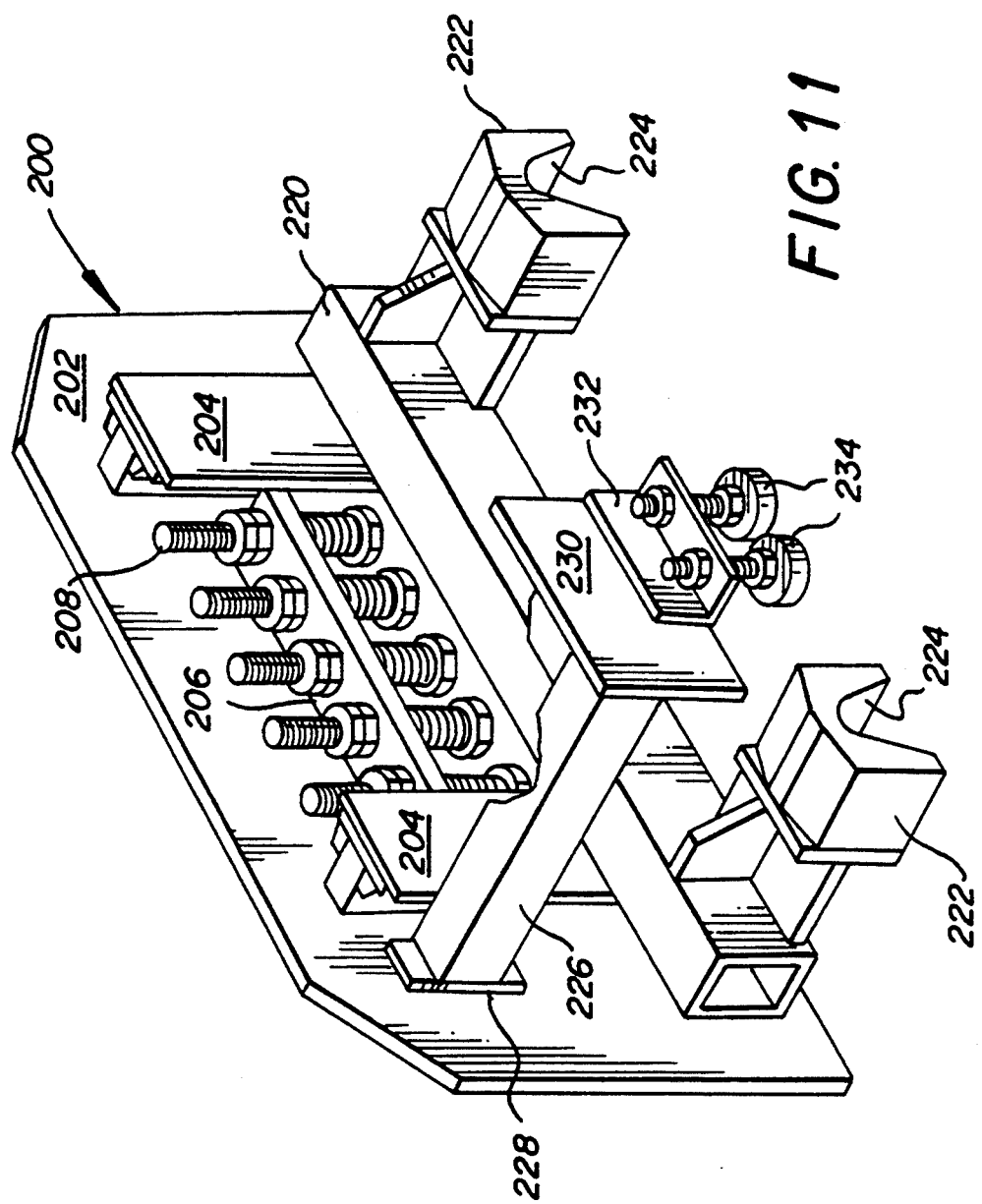

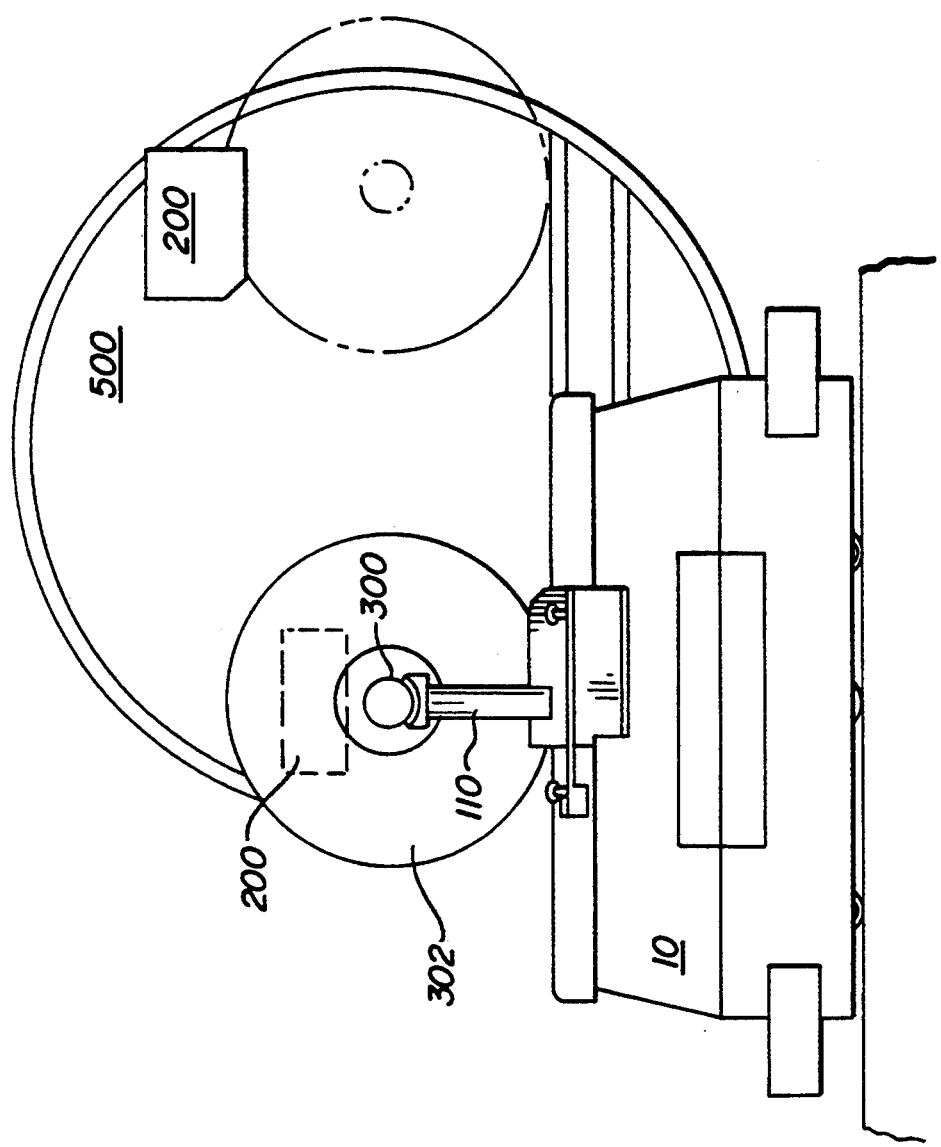

DOCKING APPARATUS

CROSS-REFERENCE TO RELATED APPLICATION

This application is related to co-pending U.S. patent application Ser. No. 040,947, filed 31 Mar. 1993, entitled "Apparatus And Method For Transferring A Load" and now abandoned.

1. Field of Invention

The present invention concerns an apparatus for docking with a load-conveying vehicle. In particular, the invention concerns such apparatus for guiding in and securing thereto the vehicle for carrying out load transfers to or from the vehicle. The invention is particularly suited for use with an automatic guided load-conveying vehicle.

2. Background of the Invention

Most industrial applications and manufacturing facilities involve a substantial amount of material conveying and handling. Accordingly, much effort has been devoted to providing efficient and economical means to perform these operations.

One response has been the development of robotic or automatic guided vehicles that are capable of picking up a load from one station, carrying it along a predefined path, and depositing the load at a second station. Generally, such jobs allow for a substantial amount of error in the course of the docking maneuvers, that is, the unloading and loading maneuvers, and such an apparatus, although suitable for a forklift-type operation, may be unsuitable for operations requiring close placement and positioning during dockings. In the latter situations, generally an operator is required to ensure the proper proximity between the load-handling equipment and the stations.

It is desirable, however, in many applications to proceed without an operator's having to be present at all times. One such instance is in the handling of rolls of sensitized photographic film rolls. As is well-known, such operations have to proceed in a dark environment in order to avoid exposing the sensitized film. Roll-handling therefore takes place in the dark, where it is difficult for an operator to view and monitor the operation. As a result, during roll transfer and handling, equipment misalignments can occur, resulting in damaged equipment or damaged product.

It is an object of the invention to provide an apparatus for transferring loads to and from a load-conveying vehicle without requiring an operator present, and which provides good tolerances during a docking operation.

SUMMARY OF THE INVENTION

The present invention is directed to overcoming one or more of the problems set forth above.

Briefly summarized, the invention provides a docking assembly for docking with a vehicle, the vehicle comprising a nonrigid docking member having means for positioning mounted thereon, the docking assembly comprising:

a frame; and a positioning slot mounted on the frame and having flared walls for guiding therein and securing thereto the means for positioning of the second assembly to thereby dock the second assembly to the docking assembly.

The invention performs load transfers without the presence of an operator. The transfers are complete within close tolerances difficult to obtain by prior art devices and methods during vehicle docking operations.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 11 shows a perspective elevation view of a docking assembly according to the invention.

FIG. 14 shows a side, elevation view of a docking assembly in accordance with the invention mounted on a turret winder, with a docking assembly and a roll shown in phantom to illustrate two-roll handling.

DESCRIPTION OF THE PREFERRED EMBODIMENTS

Figure 1:
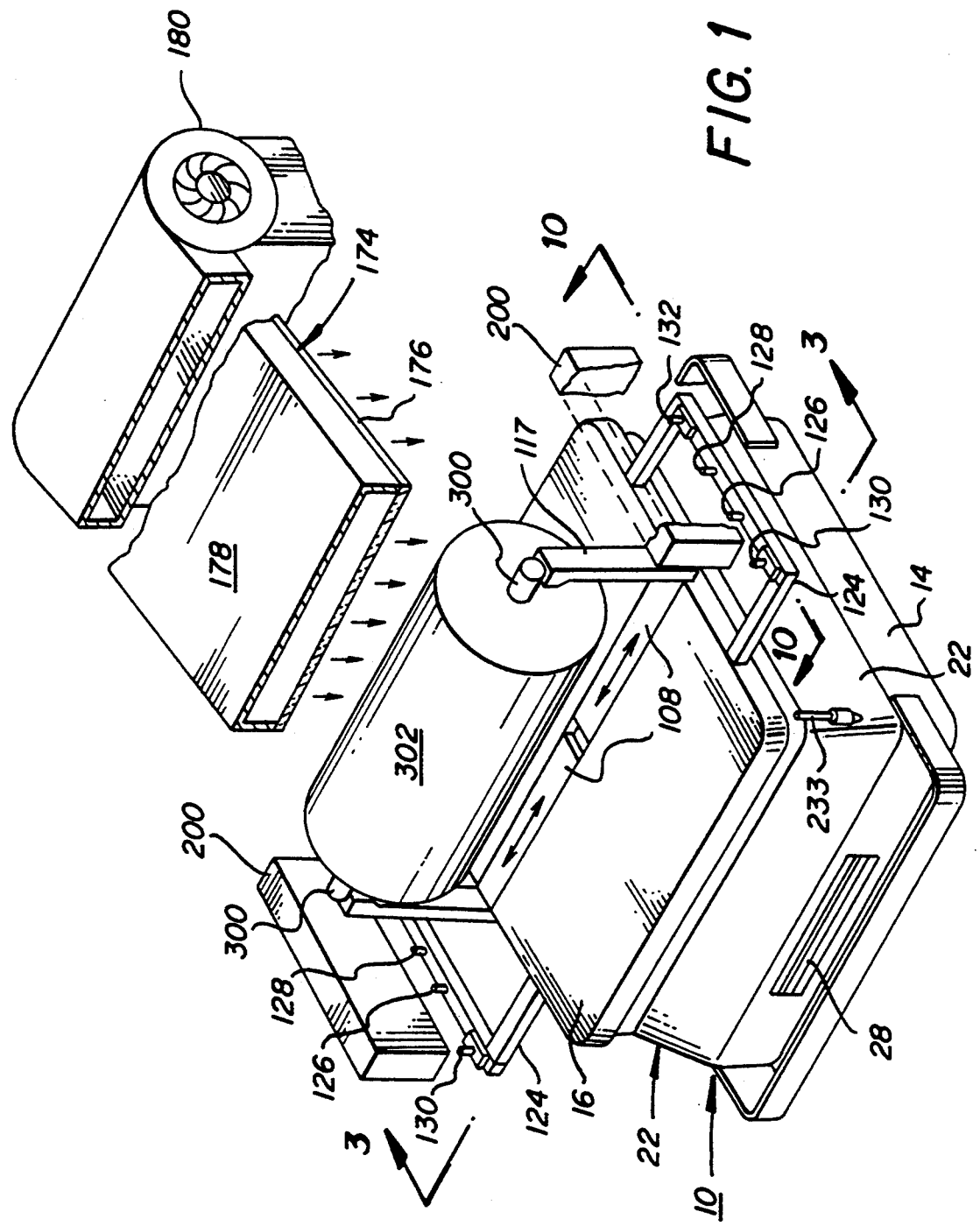
FIG. 1 shows a perspective elevation view of an automatic guided vehicle positioned as in a docking operation, with each side of the vehicle adjacent to a docking assembly with one assembly shown fragmented, according to the invention.

The following is a detailed description of the preferred embodiments of the invention, reference being made to the drawings in which the same reference numerals identify the same elements of structure in each of the several Figures. In the Figures, the orientation of the various structures is specified with respect to a selected arbitrary orientation of the automatic guided vehicle designated as "Front" and "Rear". This is only to facilitate understanding the relative positioning of the various structures, shown separately in the several Figures, in the vehicle, and is not meant to indicate a preferred mode or direction of travel of the vehicle.

Figure 2:
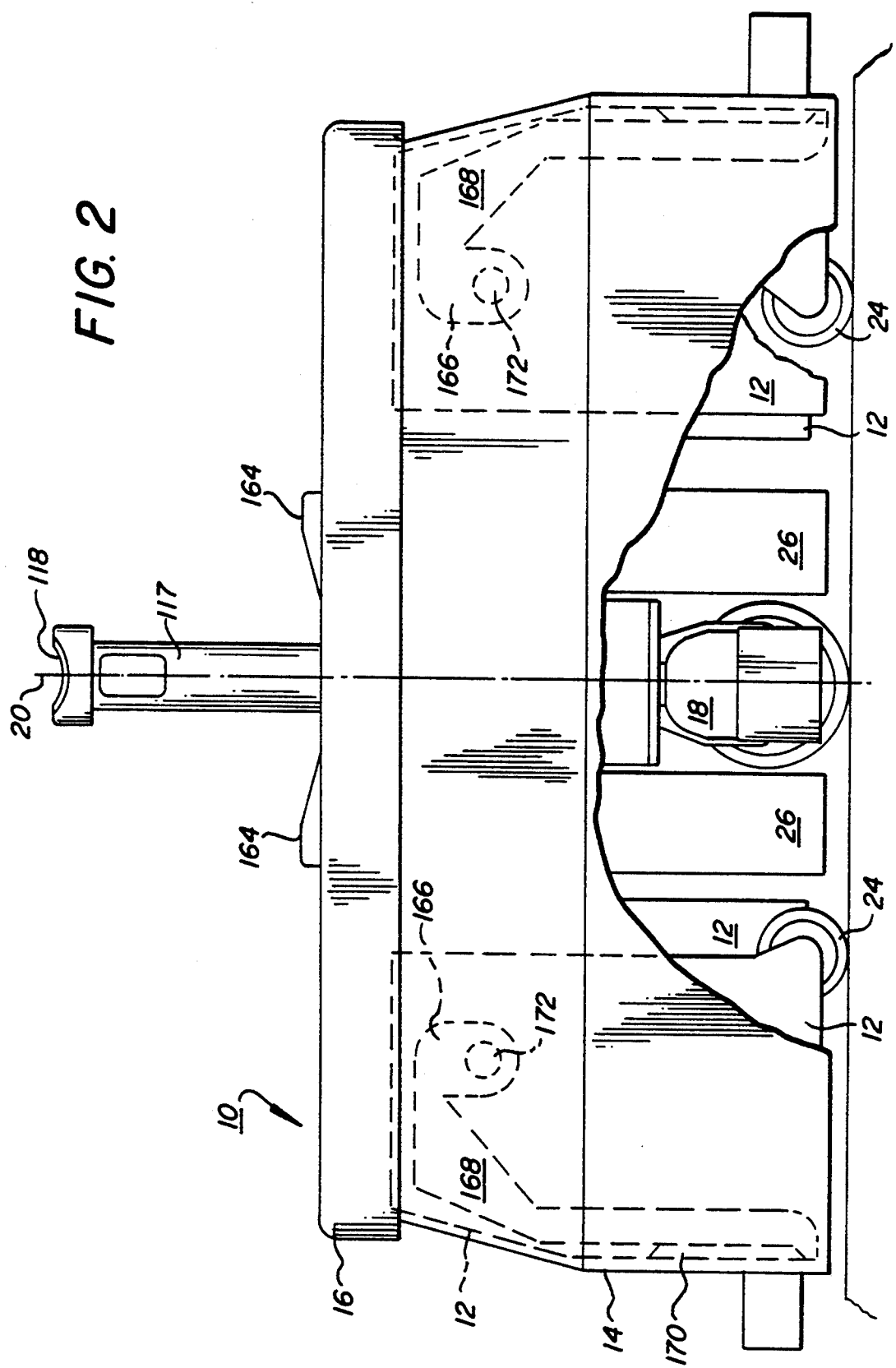
FIG. 2 shows a side, partially fragmentary, elevation view of the vehicle of FIG. 1, exposing details of the drive assembly and other structure.

FIGS. 1 and 2 are a perspective elevation view and a side elevation view, respectively, of an automatic guided vehicle 10 in accordance with the present invention. Vehicle 10 comprises a frame 12, shown partially in phantom in FIG. 2, on which is mounted a cowl 14 and a cowl cover 16. A pair of drive wheel assemblies 18 are mounted on frame 12 along the center axis 20 of vehicle 10 and just inboard of each sidewall 22. A swivel caster wheel assembly 24 is mounted at each end of vehicle 10 on frame 12 inboard of and midway between side walls 22. Each drive wheel assembly 18 is independently associated with drive means (not shown) comprising a reversible, variable speed motor, which, by matching up or varying the relative speeds of assemblies 18, respectively drive vehicle 10 either forward or backward, or cause vehicle 10 to traverse a turn or follow a nonlinear path. A rechargeable battery 26 is electrically connected to each drive means. Charging means (not shown) are provided to recharge batteries 26. The front and the rear of vehicle 10 are each equipped with an exhaust grille 28 associated with an air-cleaning system that will be described in more detail later.

Figure 3:
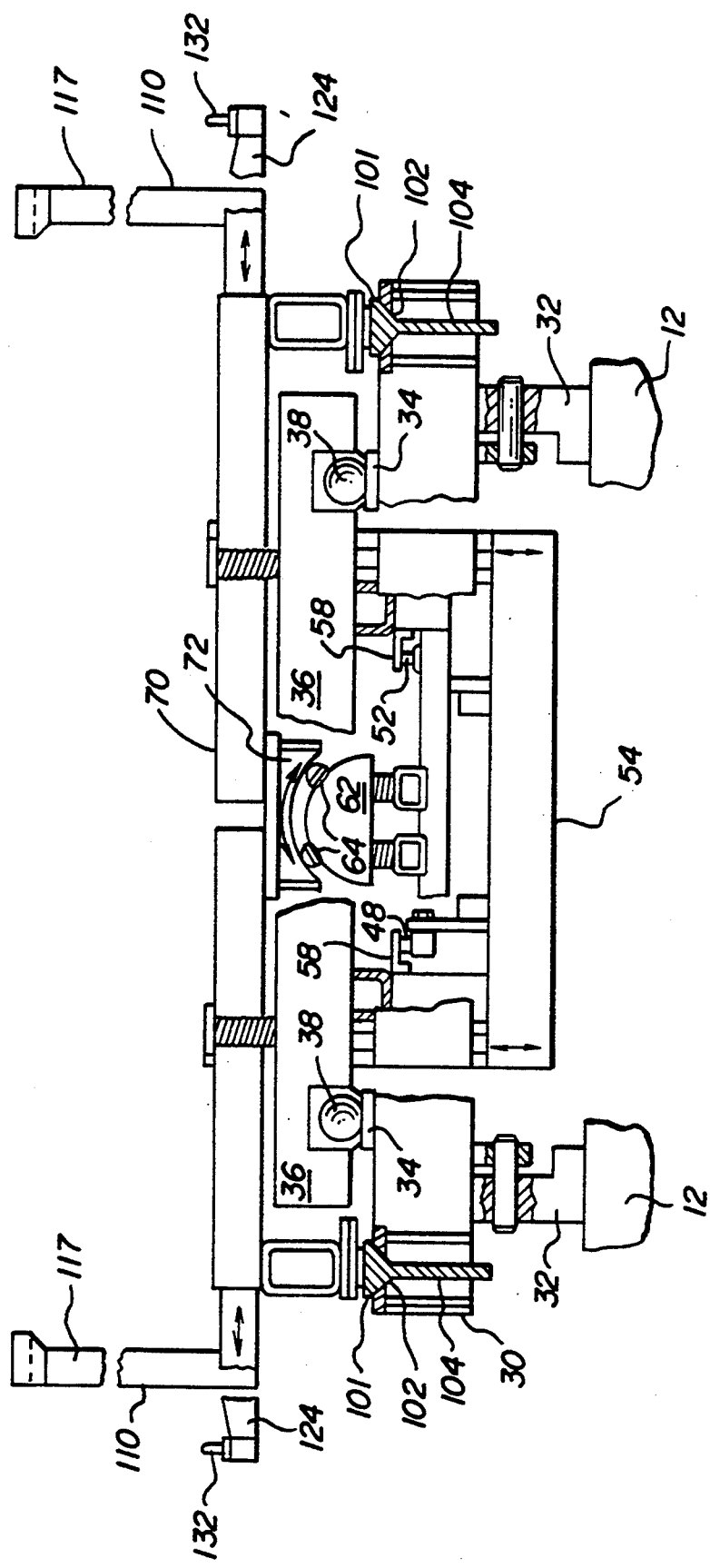
FIG. 3 shows a sectional elevation view taken along line 3—3 of FIG. 1, showing the upper tray and associated structures with the tray in the fully lowered position.
Figure 4:
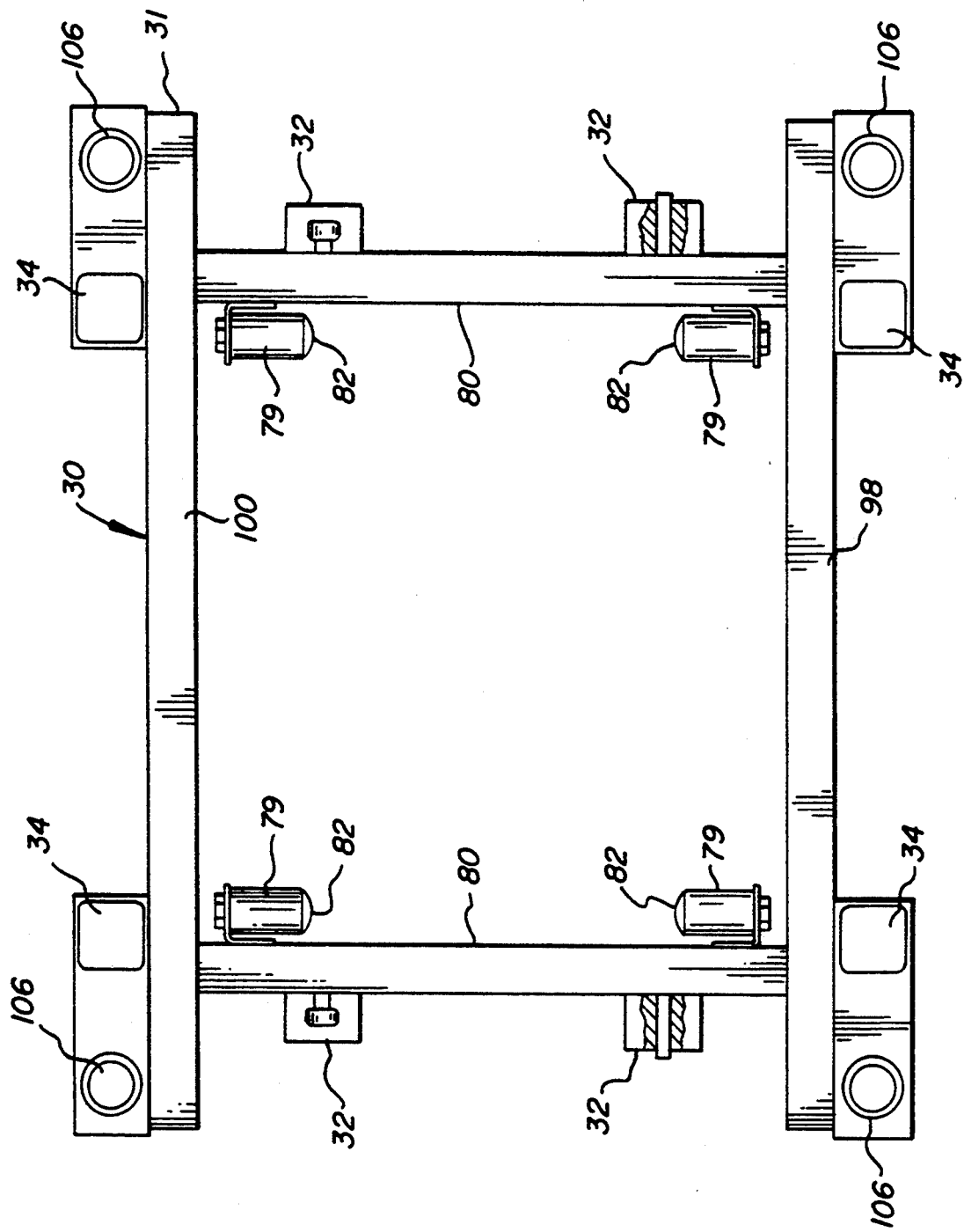
FIG. 4 shows a top plan view of the lower lift mounting structure according to the invention.
Figure 5:
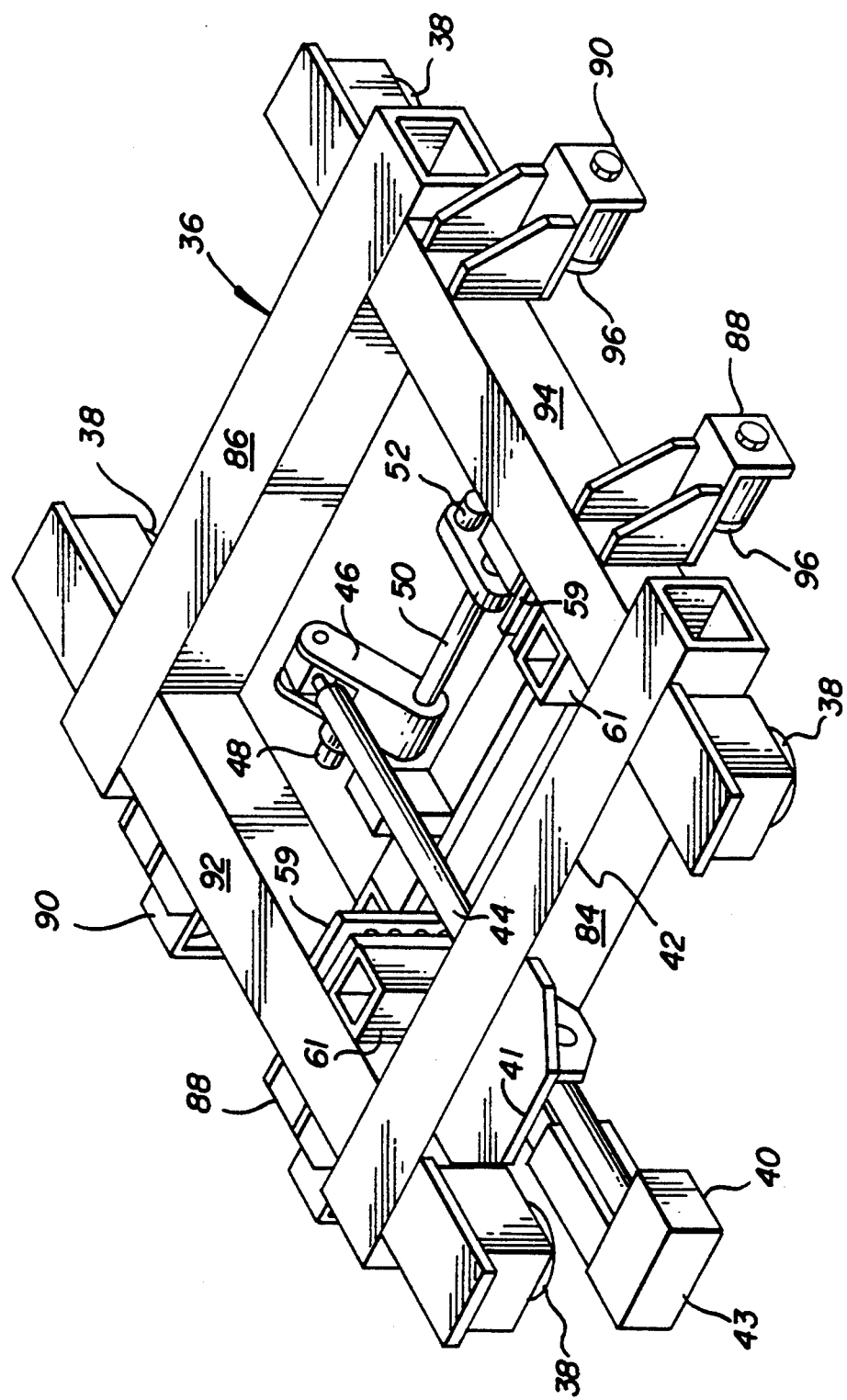
FIG. 5 shows an enlarged, perspective elevation view of the lower lift assembly according to the invention.
Figure 6:
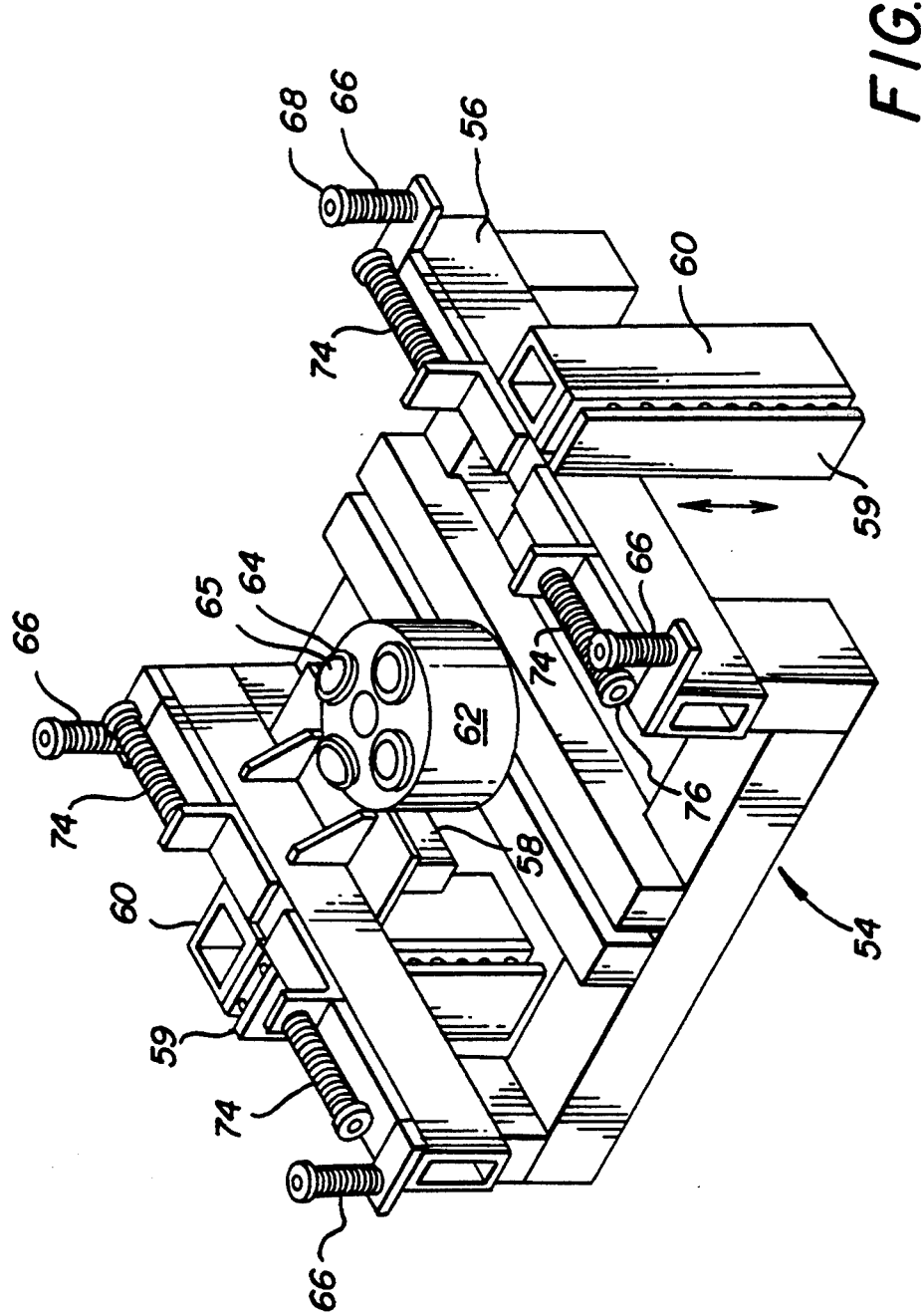
FIG. 6 shows an enlarged, perspective elevation view of the upper lift assembly according to the invention.

Referring simultaneously to FIGS. 3-6, lower lift mounting structure 30 comprises a rectangular frame 31 that is mounted to frame 12 in a horizontal plane by four mounting brackets 32. Lower lift structure 30 has a roll plate 34 on its upper surface at each corner for supporting a lower lift assembly 36 of FIG. 5 by ball transfer members 38. A vertical lift assembly 40 of FIG. 5 is mounted by bracket 41 to frame 42 of lower lift assembly 36 and comprises an electronic actuator 43 and an actuator rod 44. Crank arm 46, pivotally attached to rod 44, has a cam follower 48 rigidly mounted on one side and a pivot rod 50 rigidly mounted to crank arm 46 and rotatably mounted to frame 42. Another cam follower 52 is rigidly mounted on pivot rod 50 in the same horizontal plane as cam follower 48. An upper lift assembly 54 of FIGS. 3, 6, and 7 comprises a rectangular frame 56 on which are mounted downwardly extending and facing support plates 58, only one of which appears in FIG. 6, that respectively seat on cam followers 48 and 52. Upper lift assembly 54 thus is supported in this manner by lower lift assembly 36.

A vertical ball slide 59 is mounted outboard on each side of frame 56 by vertical supports 60, and each ball slide 59 is positioned in a vertical guide 61 mounted inboard on each side support member of frame 42 of lower lift assembly 36. A ball support member 62, having four ball bearings 64 mounted equidistant in a horizontal plane along a minor circumference of ball support member 62 and each ball bearing 64 having an exposed upper bearing surface 65, is mounted at the center of frame 56. A leveling spring 66 having an upper support surface 68 is positioned at each of the four corners of frame 56 for supporting an upper tray assembly 70 while permitting a limited amount of vertical movement against each spring 66.

Upper tray assembly 70 is the means for loading, carrying, and unloading a load, in cooperation with the other structure discussed herein. On the underside of tray 70 is concave seat 72 by which tray 70 seats on bearing surfaces 65. Upper lift assembly 54 has an adjustable rotation-centering spring 74 horizontally mounted on frame 56 inboard of each leveling spring 66, each spring 74 having a surface 76 for contacting frame 78 of tray 70 and in order to restrain tray 70 within an acceptable design limit of horizontal movement. Tray 70, when in a raised position as is further discussed below, therefore is nonrigidly supported by frame 12 via assembly 31, assembly 36, and frame 54 and has some freedom to tilt about ball support member 62 and to move horizontally. Thus, tray 70 is mounted for movement with three degrees of freedom relative to frame 12 of vehicle 10.

It can be seen that, although tray 70 therefore has limited freedom of off-vertical movement with respect to upper lift assembly 54, vertical ball slide member 59 and vertical guide member 60 cooperate to substantially restrict upper lift assembly 54's off-vertical movement relative to lower lift assembly 36. To introduce a further degree of freedom of off-vertical movement for the top assemblies of vehicle 10 relative to lower lift structure 30 and frame 12, a pair of opposed, horizontally-mounted positioning springs 79 are mounted on the inboard vertical surface of each horizontal frame member 80 of frame 31. Each spring 79 has a surface 82 for contacting the respective outboard vertical surfaces of frame members 84 and 86 of frame 42 of lower lift assembly 36. Similarly, a pair of opposed positioning springs 88 and 90 are horizontally mounted outboard on each frame member 92 and 94 of frame 42, each spring having a surface 96 for contacting the respective outboard vertical surfaces of frame members 80 of frame 31. Positioning springs 79, 88, and 90 thereby permit lower lift assembly 36 limited off-vertical movement with respect to lower lift mounting structure 30.

Figure 7:
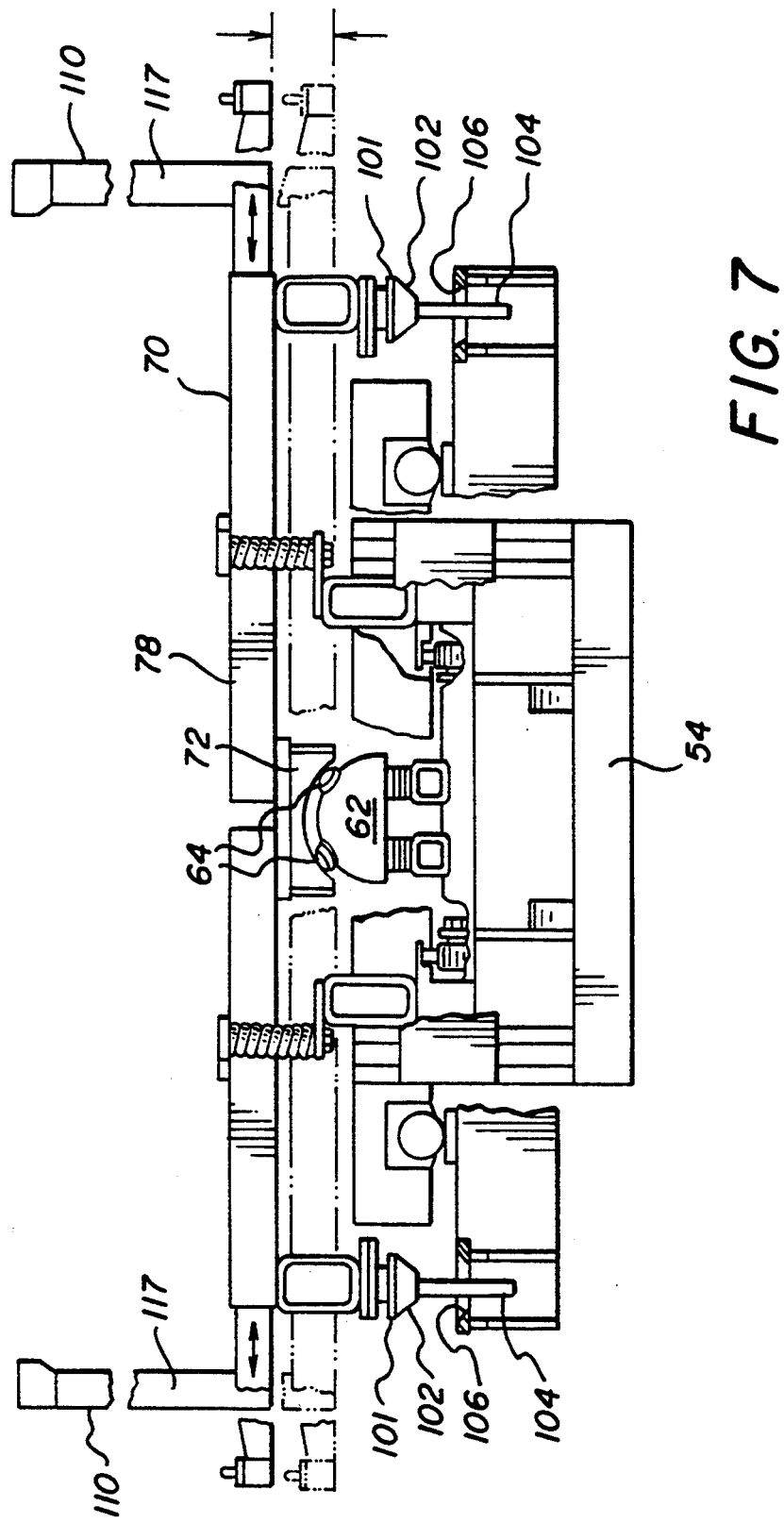
FIG. 7 shows the structure of FIG. 3, but with the tray in a raised position, and with a portion of the tray structure in the fully lowered position shown in phantom.
Figure 8:
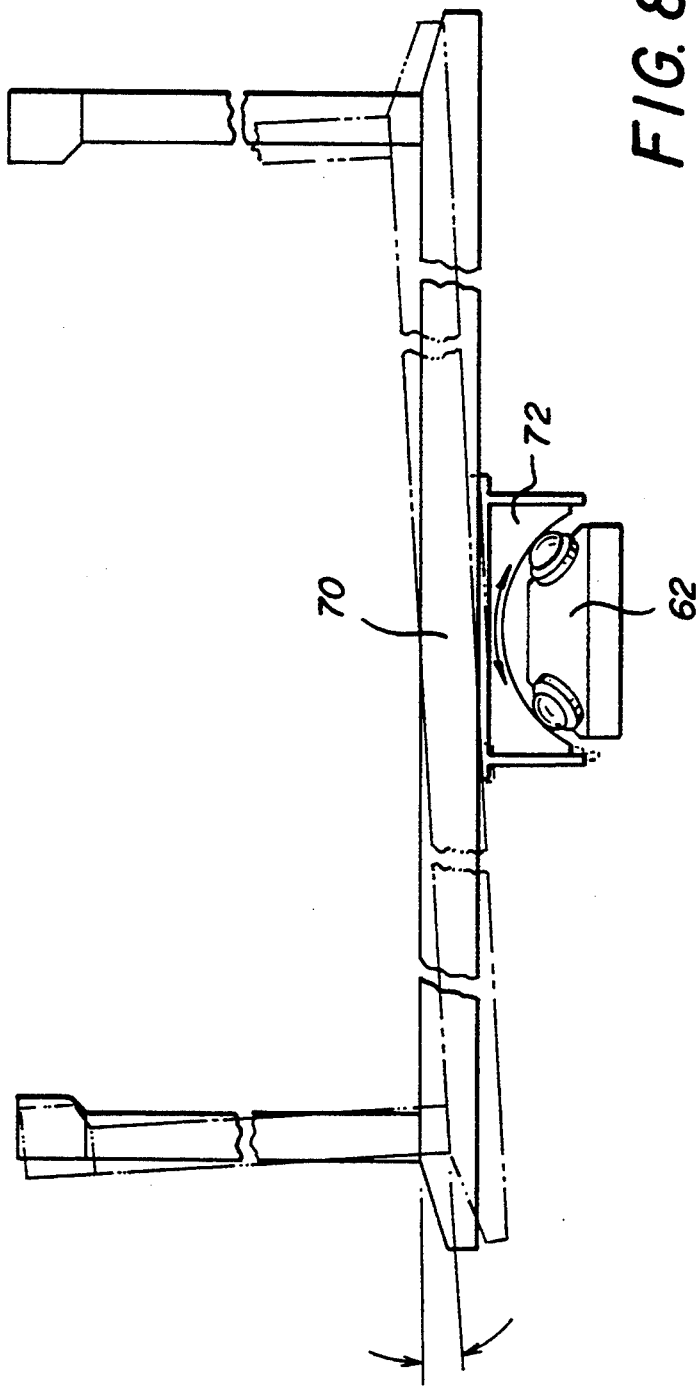
FIG. 8 shows a front elevation view of the tray, illustrating a tilting of the tray on its seat about the center ball joint.
Figure 9:
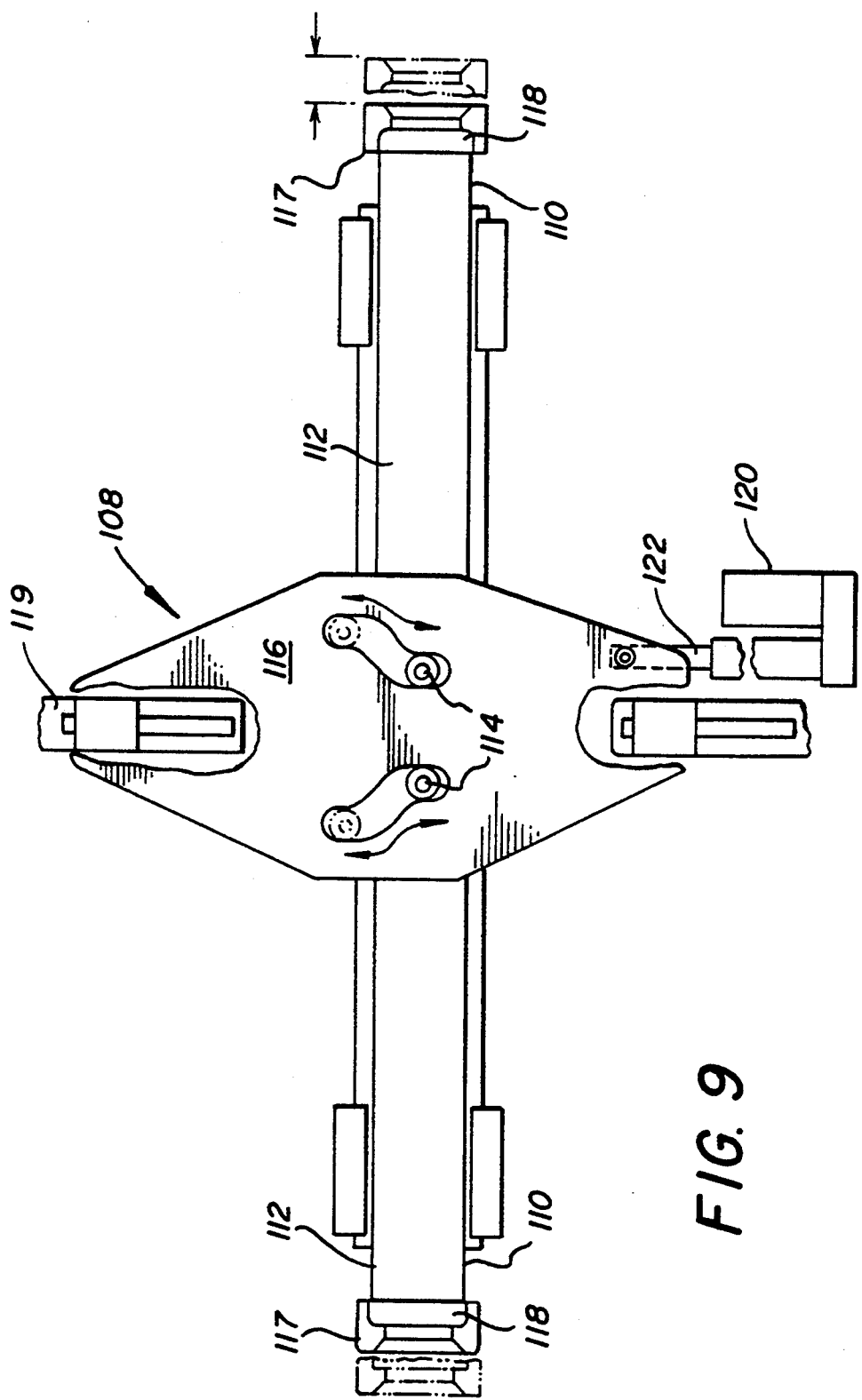
FIG. 9 shows a top plan view of the cradle assembly according to the invention.

The support for tray 70 and the off-vertical freedom of movement of tray 70 vary, depending on whether tray 70 is in a raised position or in a fully lowered position, as follows. Tray 70 has four downwardly-extending centering pins 101, one each mounted on the underside of frame 78 at each corner. Each pin 101 has a spherical seating surface 102 and a depending leg 104. As seen in FIG. 4, lower lift mounting structure 30 comprises parallel frame members 98, 100 joined to parallel frame members 80. Structure 30 also has a concave annular seat 106 on each upper surface of each corner of frame 31 for receiving, positioning, and seating each surface 102 thereon. When upper lift assembly 54 and tray 70 are fully lowered, support for tray 70 is transferred from upper lift assembly 54 to lower lift mounting structure 30, as each surface 102 is seated in each seat 106 as shown in FIG. 3, and tray 70 is rigidly supported and without the limited freedom of movement it has when raised and pins 101 are unseated. FIG. 7 shows upper lift assembly 54 and tray 70 in a raised position, in which surfaces 102 are raised from seats 106, permitting off-vertical movement of tray 70 as allowed by the clearance between each leg 104 and seat 106 and the other restraining means described above. FIG. 8 schematically shows tray 70 in a tilted position.

Now turning to FIGS. 1-3 and 9, a cradle arm assembly 108 is slidably mounted on the upper surface of tray 70. Assembly 108 comprises a pair of cradle arms 110 comprising a slidable horizontal member 112 having a cam follower 114 positioned in a slotted cam plate 116 and a vertical arm 117 having a concave seat 118 for supporting each end of an object such as a large film roll. Plate 116 is slidably mounted on horizontal guide 119. Plate 116 is moved along guide 119 by an electronic actuator assembly 120 having an actuator rod 122 that is attached to plate 116. Cradle arms 110 move toward each other as rod 122 extends and separate as rod 122 retracts. Positioned on tray 70 outboard of each cradle arm 110 are brackets 124, each having mounted thereon a pair of position sensors 126 and 128 and a pair of positioning pins 130 and 132 that together comprise means for positioning the means for loading, carrying, and unloading in docking relationship to a loading and unloading station.

Figure 10:
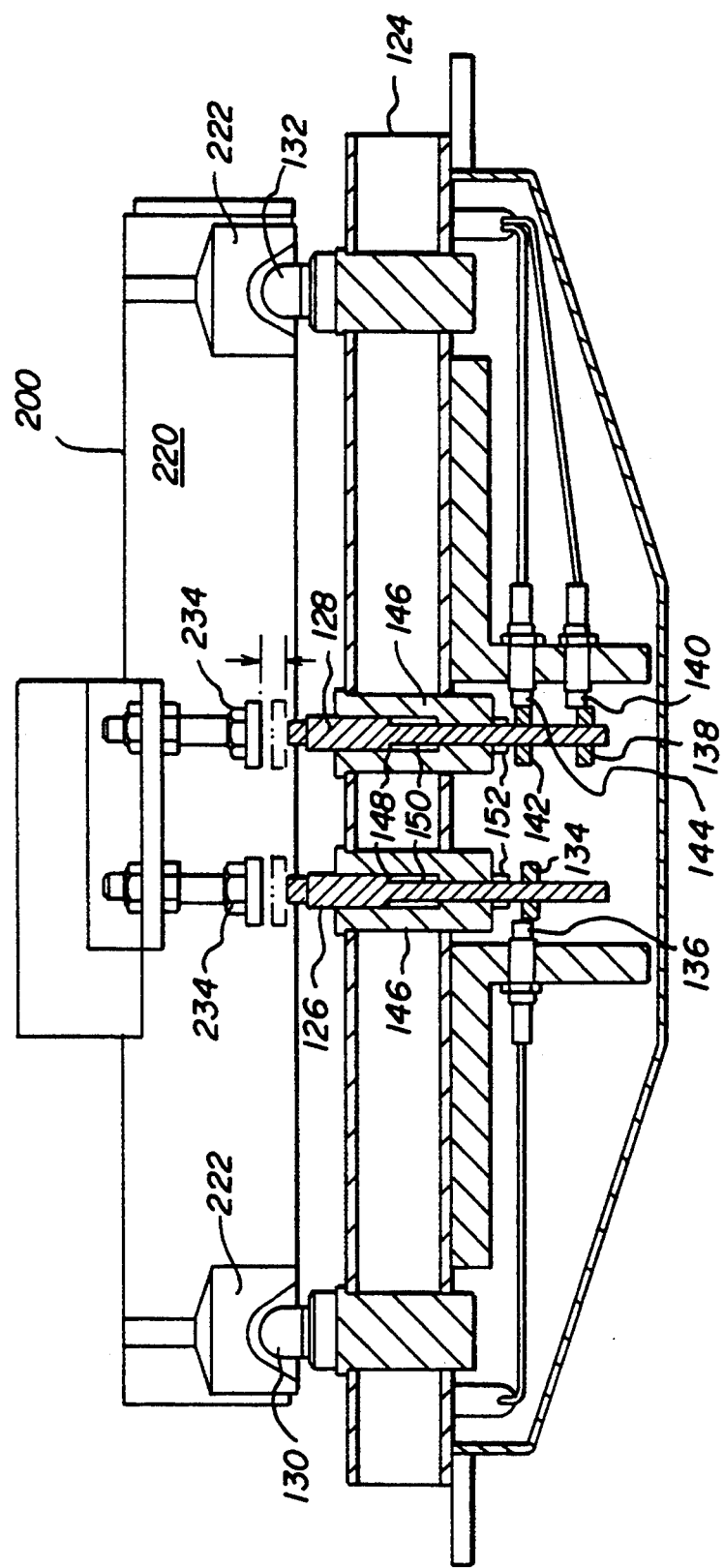
FIG. 10 shows a sectional elevation view taken along line 10—10 of FIG. 1 of a cradle assembly and a docking assembly during a docking operation according to the invention.

As shown in FIG. 10, position sensor 126 has shaft collar 134 for making and breaking electrical contact with pin engagement sensor 136. Position sensor 128 has shaft collar 138 for making and breaking electrical contact with load interface sensor 140, and shaft collar 142 for making and breaking electrical contact with vertical overtravel sensor 144. Each position sensor 126 and 128 is slidably mounted in a bushing 146 positioned in bracket 124 and has an upper flange 148. A spring 150 is positioned in bushing 146 to engage upper flange 148. Positioning sensors 126 and 128 each have a retaining collar 152 that restricts upward travel while allowing downward movement against spring 150.

Figure 12:
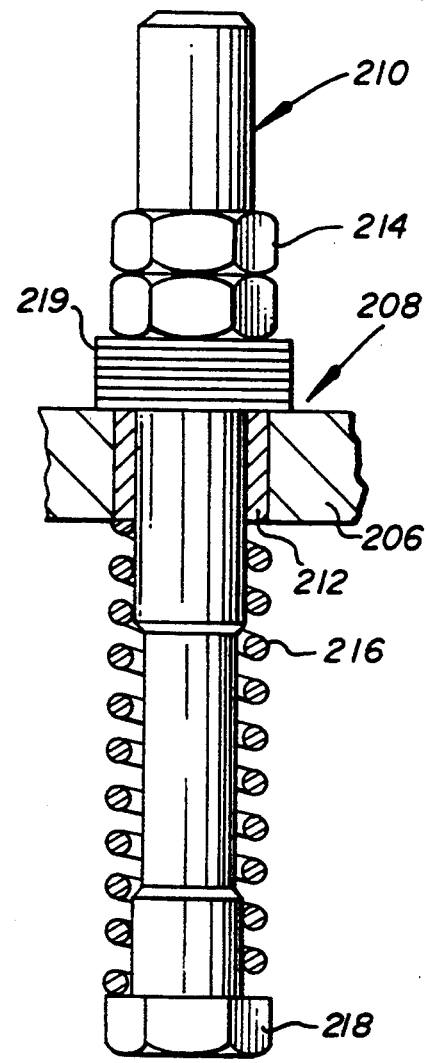
FIG. 12 shows an enlarged, sectional view of part of a positioning leveling assembly according to the invention.

FIGS. 10–12 show docking assembly 200. Assembly 200 comprises a frame 202 to which are mounted a pair of vertical guides 204. Bracket 206 is rigidly mounted on frame 202 between guides 204 and has five positioning leveling assemblies 208 mounted thereon. Each positioning leveling assembly 208 comprises a throughbolt 210 slidably mounted within a bushing 212 that is positioned in bracket 206. Throughbolt 210 has a retaining nut 214 that secures throughbolt 210 to bracket 206. A spring 216 is snugly positioned on bolt 210 and compressibly fitted between head 218 and the lower surface of bracket 206 to provide a biasing force against head 218 and provide resistance to upward movement of throughbolt 210. Spacing washers 219 allow for vertical adjustment of throughbolt 210. A bracket 220 is slidably mounted on guides 204 and has a pair of downward-facing slots 222 mounted thereon. Each slot 222 has flared walls 224 for guiding therein and securing a positioning pin 130 or 132. A bracket 226, rigidly mounted at its proximate end 228 to plate 202, has a distal end 230 on which is mounted a bracket 232. A pair of vertical position actuators 234 are mounted on and depend from bracket 232. Position leveling assemblies 208 are mounted so that heads 218 are positioned just above bracket 220.

In operation, the movement of vehicle 10 is controlled by command signals, which can be directed at antenna 233 of vehicle 10 remotely by radiofrequency transmission and received by a receiver positioned on vehicle 10 that is associated with an on-board controller (not shown) that operates independent drive wheel assemblies 18, thus directing vehicle 10's movement as is well-known in the art. The command signals can be sent manually as by an operator, or in a preferred mode automatically, as by a programmed sequence that is controlled by a computer, such as a process logic controller or the like (not shown). Vehicle 10 can thereby be directed between a pair of stationary docking assemblies 200, one positioned at either side of vehicle 10, whereby the front and rear of vehicle 10 are spaced a predetermined distance from each docking assembly 200.

A roll transfer operation transferring a roll from vehicle 10 to a roll holding station is as follows. Each cradle arm 110 of vehicle 10 is initially supporting one end of core 300 of roll 302, as illustrated in FIG. 1. The controller directs vehicle 10 into docking position between the pair of docking assemblies 200, as discussed above, and then signals actuator 43 to retract, pivoting arm 46 about pivot rod 50 and causing cam followers 48 and 52 to traverse an ascending arc and raise upper lift assembly 54 by support plates 58. Upper lift assembly 54 raises tray 70 by leveling springs 66 and ball support member 62 until each position sensor 126 contacts its respective vertical position actuator 234 and moves collar 134 from contact with its pin engagement sensor 136, signalling the controller that outboard positioning pins 130, 132 are properly positioned for docking with positioning slots 222. Slots 222 are tapered so as to direct and center pins 130 as tray 70 is raised and thus ensure that tray 70 and cradle arms 110 are oriented properly for docking and roll transfer. As surfaces 102 lift off of seats 106, tray 70 is free to move about its axes as described above. Accordingly, if cradle arms 110 are somewhat out of alignment relative to assemblies 200, slots 222 guide pins 130 and thereby tray 70 into precise docking alignment with assemblies 200. Should actuator 134 fail to break contact with sensor 136, a limit switch (not shown) signals the controller to interrupt the lifting sequence. As tray 70 continues to rise, load interface sensor 140 breaks contact with collar 138, signalling that pins 130, 132 are docked in slots 222. When this position is thus sensed for each cradle arm 110, that is, for each side of tray 70 when each cradle arm 110 is docked with its respective docking assembly 200, the controller interrupts actuator 43 to stop retracting and engage a brake (not shown). During docking, each cradle arm 110 may not make simultaneous docking contact with the respective docking assembly 200, so as described, tray 70 is free to move in all directions to compensate for such misalignments. Also, bracket 220 is slidably mounted on docking assembly 200, and leveling assemblies 208 are spring-loaded to permit some overtravel in leveling each cradle arm 110 relative to each docking assembly 200 and further compensate for non-simultaneous docking due to misalignments. Thus, should pins 130 and/or 132 be forced against slots 222, bracket 220 is free to slide on vertical guides 204 until the upper surface of bracket 220 contacts positioning leveling assemblies 208, which can resist further upward movement of pins 130/132 by means of springs 216.

Figure 13:
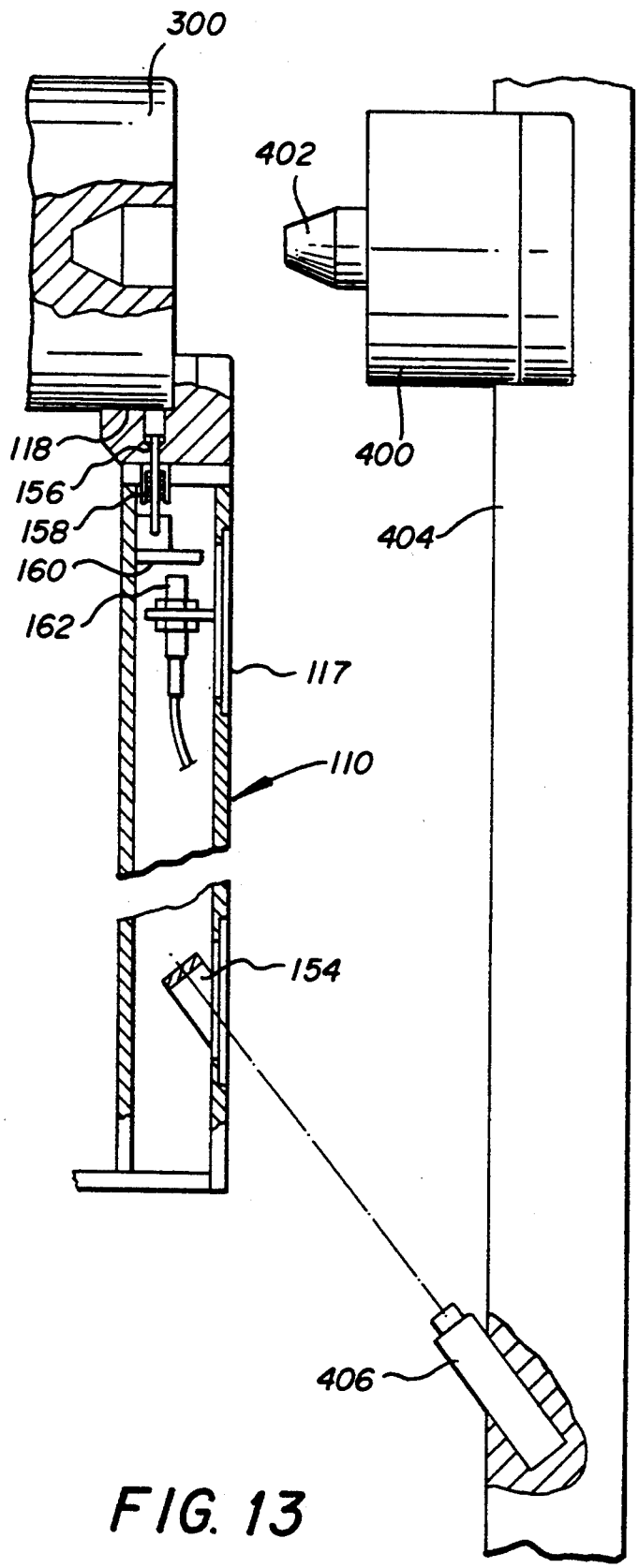
FIG. 13 shows a sectional elevation view of a cradle arm and a spindle assembly on a frame in accordance with the invention.

In this manner, upon docking, each cradle arm 110 is positioned adjacent to and brought into axial alignment with a retractable spindle assembly 400, illustrated in FIG. 13. Assembly 400 has a spindle 402 and is mounted onto a frame 404, which can comprise any one of a number of types of roll transfer of stations, such as a roll-handling or roll prep station, a roll winder, a roll unwinder, or associated turret assembly as is well-known in the art, to name but a few. A photocell 406 is positioned on frame 402 to direct a light beam against a reflector 154 on cradle arm 110 to provide an indication that the position of vehicle 10 is such that each cradle arm 110 is in the desired proximity to each respective spindle assembly 400. Cradle arm 110 also has a plunger assembly 156 having a biasing spring 158 that lowers a contact plate 160 against a load sensor 162 when a core is properly positioned onto seat 118. Roll stops 164 are provided on either side of cradle arms 110 extending along the top surface of vehicle 10 to provide further restraint and support for roll 302. In response to a signal from the controller, each spindle assembly 400 extends and engages spindle 402 with an end of core 300 to provide support for roll 302 at each end. The controller then signals actuator 43 to lower tray 70 sufficiently to disengage core 300 from cradle seats 118, leave roll 302 supported by spindles 402, and provide clearance between the top of each cradle arm 110 and the lower surface of respective spindle assemblies 400. Actuator 120 then retracts rod 122, causing cradle arms 110 to separate and provide sufficient clearance between cradle arms 110 and roll 302 for vehicle 10 to pull out of the roll transfer station.

Similarly, roll transfer operations from a roll handling station to vehicle 10 are carried out in the same fashion but in the reverse order.

FIG. 14 illustrates a roll-handling apparatus in accordance with the invention. Rotatable turret 500 has an assembly 200 mounted on each side thereof, one side being shown in FIG. 14. One end of a roll 302 is transferred from vehicle 10 to assembly 200. As discussed above, a second turret (not shown) is also provided for transfer of the other end of roll 302 to a second assembly 200. Once vehicle 10 is positioned as desired and so as not to interfere with the roll-handling operation, turret 500 (and its opposite counterpart) can rotate to position roll 302 as desired for any of various roll-handling operations, such as winding, unwinding, or roll-prep, to name but a few. If desired, two or more assemblies 200 can be positioned on each turret 500, such as positioning one assembly 200 opposite a second assembly 200, in order to handle two roll cores simultaneously. In this manner, new or empty roll cores can be loaded or unloaded as desired, and a vehicle 10 used to load or unload as needed for each particular operation desired.

Vehicle 10 is also equipped with an air-cleaning system comprising, at each end, a centrifugal blower 166, shown in phantom in FIG. 2, having an outlet duct 168 directed into a HEPA air filter assembly 170 covered by the previously described grille 28. The inlet 172 on each side of each blower 166 is open to spaces inside vehicle 10 via which air is drawn from the underside of vehicle 10. Cowl cover 16 is sealed onto cowl 14 to obtain a substantially air-tight construction while leaving a gap between the bottom of cowl 14 and the floor to allow air to be drawn therefrom. Vehicle 10 therefore functions as it operates within and travels about its environs to help maintain a clean operating environment and remove airborne particulate contamination, an important advantage in environments such as film roll coating and handling facilities.

To aid in maintaining a clean environment in the immediate vicinity of roll 302, there is provided air cleaning and delivery means positioned overhead of vehicle 10 for directing a stream of filtered air over the load as shown by the direction arrows in FIG. 1, comprising a bank of overhead panels 174, each having a HEPA filter 176 mounted therein, and having a top inlet 178 ducted to the outlet of an air delivery assembly 180, by which air is directed into inlet 178 over filter 176 and downward onto roll 302. Roll 302 is thereby shrouded with filtered air as it is conveyed about by vehicle 10, helping to minimize acquisition of particulate contamination by roll 302, an important consideration in clean-room types of facilities or in other operations requiring clean load transporting, such as in photographic film manufacturing operations.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

What is claimed is:

1. A docking assembly for docking with a vehicle, the vehicle comprising a frame, a docking member mounted for movement with three degrees of freedom relative to the frame, a vertical position sensor mounted on the docking member and positioning means mounted on the docking member, the docking assembly comprising:
   a further frame;
   a vertical position actuator mounted on the further frame for contacting the vertical position sensor to thereby indicate that the docking assembly is positioned properly relative to the vehicle carry out a docking maneuver;
   a pair of vertical guides mounted on the further frame;
   a bracket slidably mounted on the vertical guides;
   a positioning slot mounted on the bracket, the positioning slot having flared walls for guiding therein and securing thereto the positioning means of the docking member to the relay clock the docking member to the docking assembly; and
   a position leveling assembly mounted on the further frame for acting against the bracket when the bracket moves in response to engagement between the positioning means and the positioning slot.

2. The docking assembly of claim 1, further comprising a turret assembly in a roll-handling apparatus, the further frame bring supported by the turret assembly.

3. The docking assembly of claim 2, wherein the vehicle comprises a further vertical position sensor and a further positioning means, the turret assembly comprises first and second turrets, and the further frame is mounted on the first turret, further comprising:
   a still further frame mounted on the second turret;
   a further vertical position actuator mounted on the still further frame for contacting the further vertical position sensor;
   a further pair of vertical guides mounted on the still further frame;
   a further bracket slidably mounted on the further pair of vertical guides;
   a further positioning slot mounted on the further bracket, the further positioning slot having flared walls for guiding therein and securing thereto the further positioning means of the docking member; and
   a further position leveling assembly mounted on the still further frame for acting against the further bracket when the further bracket moves in response to engagement between the further positioning means and the further positioning slot.

* * * * *